United States Patent Office 3,608,135
Patented Sept. 28, 1971

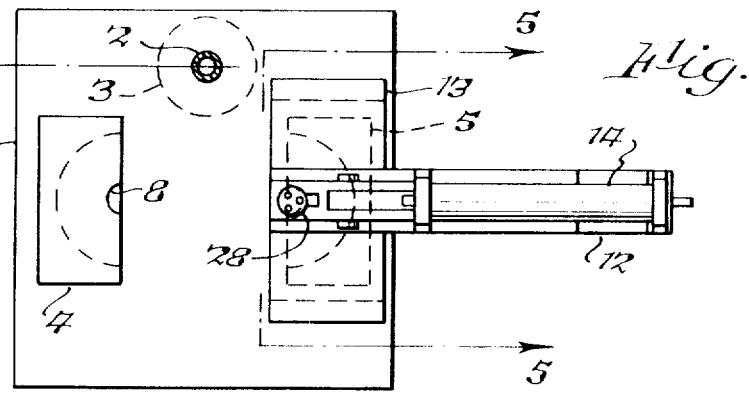
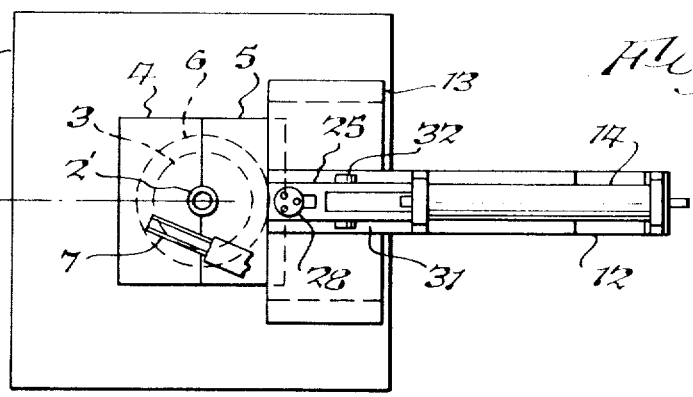
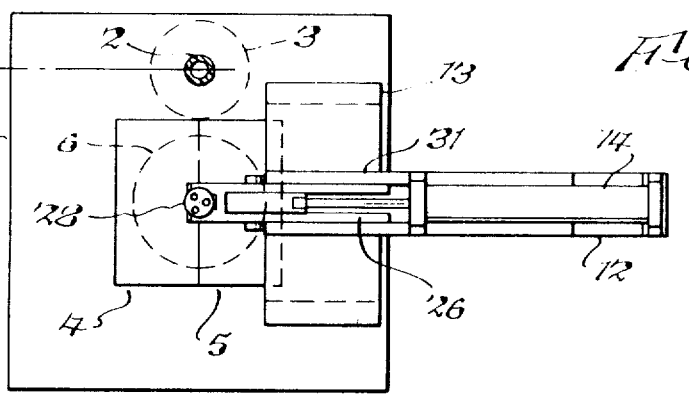
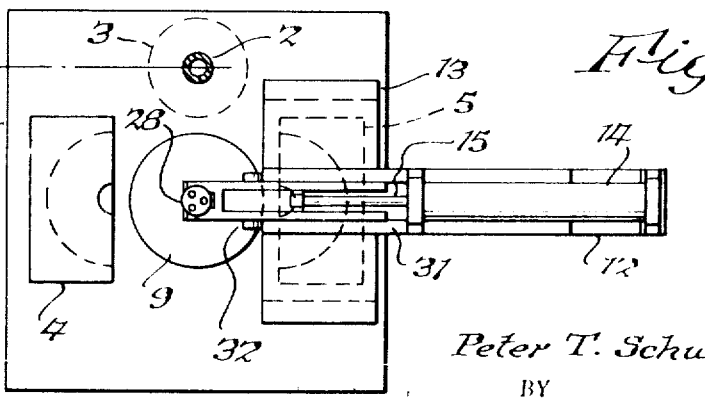

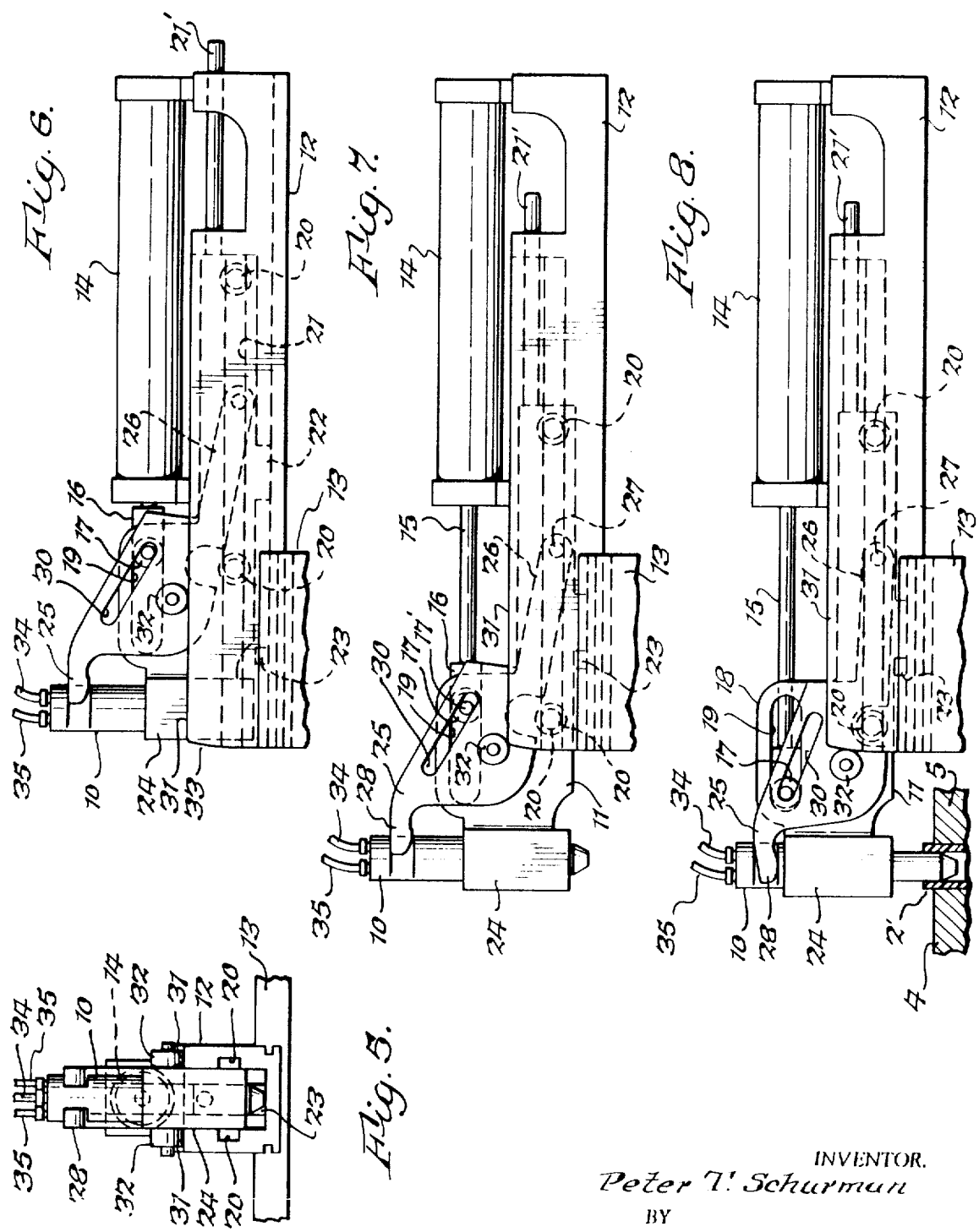

3,608,135
BLOW MOLDING MECHANISM
Peter T. Schurman, Woodbridge, Conn., assignor to The Plastic Forming Company, Inc., Woodbridge, Conn.
Filed Feb. 5, 1969, Ser. No. 796,833
Int. Cl. B29d 23/03
U.S. Cl. 18—5BA
6 Claims

ABSTRACT OF THE DISCLOSURE

A nozzle carrier movable along a first axis between extended and retracted positions, and a blow nozzle carried by the carrier and movable relative thereto along a second axis into and out of blowing position. The nozzle is connected to the drive through a force multiplying mechanism of increasing ratio as the nozzle approaches blowing position. For top blowing, the carrier and a sectional mold are mounted on a mold support for movement in a generally horizontal plane laterally of the extrusion axis, the extended position of the carrier positioning the nozzle for movement into the top of the mold.

BACKGROUND OF THE INVENTION

This invention relates to the blow molding of hollow articles from thermo-plastic materials.

It is customary to top blow plastic bottles and similar articles by moving cooperating mold sections between a first position alined with the axis of extrusion and a second position centering the closed mold with a blow pin or nozzle. Movement of the closed mold into centered position relative to the blow pin requires close tolerances, thereby posing a problem.

It has been proposed to mount the blow pin on the mold support for movement therewith, but problems still remain in providing such an arrangement in an apparatus which is compact, simple and capable of high speed operation.

Another problem lies in providing the force required to hold the blow pin or nozzle against pressure of the expanding fluid in the article being blown. This is particularly troublesome with large mouth bottles because of the large nozzle area subject to the pressure of the expanding fluid.

SUMMARY OF THE INVENTION

A primary object of this invention is to provide a blow molding apparatus incorporating hold-down means operable to maintain the nozzle in blowing position without requiring a higher fluid pressure than the expanding fluid, and without requiring a large cylinder diameter.

Another object of this invention is to provide the foregoing in a blow nozzle and nozzle carrier arrangement adapted for use in a variety of positions and with a variety of molding apparatus.

Still another object of this invention is to provide a new and useful top blow method and apparatus capable of high speed operation in a relatively limited space.

The foregoing and other objects, advantages and characterizing features of this invention will become apparent from the detailed description of an illustrative embodiment, in conjunction with the accompanying drawings depicting the same wherein like reference numerals denote like parts throughout the various views.

BRIEF DESCRIPTION OF THE DRAWING FIGURES

FIG. 1 is a generally schematic, top plan view of a blow molding apparatus of this invention, showing the same laterally offset from the extrusion axis with the nozzle carrier in its retracted position and the mold sections open;

FIG. 2 is a similar view showing the apparatus alined with the extrusion axis and with the mold sections closed about a severed length of the extruded parison;

FIG. 3 is a similar view with the apparatus again laterally offset from the extrusion axis, and with the nozzle and nozzle carrier in their extended, blowing position;

FIG. 4 is a view similar to that of FIG. 3, but with the mold sections opens after the article has been blown;

FIG. 5 is an end elevational view on an enlarged scale, taken about on line 5—5 of FIG. 1, showing the nozzle and nozzle carrier and a fragment of the bracket mounting the carrier on the mold support;

FIG. 6 is a side elevational view thereof, the nozzle and nozzle carrier being in retracted position;

FIG. 7 is a corresponding view with the nozzle carrier in its extended position and with the nozzle retracted relative to the carrier; and FIG. 8 is a corresponding view with the nozzle extended to its blowing position.

DETAILED DESCRIPTION OF THE ILLUSTRATED EMBODIMENT

A mold support 1 is movable in a generally horizontal plane laterally of the generally vertical axis along which a tube or parison 2 of molten, plastic material is continuously, downwardly extruded through an extrusion die whose relative position is indicated in broken lines at 3. A pair of mold sections 4, 5 are movable with support 1 between a laterally offset position as illustrated in FIGS. 1, 3 and 4, and a position alined with the extrusion axis as illustrated in FIG. 2. Mold sections 4 and 5 are movable relative to support 1 between an open position shown in FIGS. 1 and 4 and a closed position shown in FIGS. 2, 3 and 8.

Mold sections 4 and 5 are complementary, providing opposite halves of a cavity 6, and are adapted to receive therebetween a length 2' of parison 2 which is severed from the parent tube by a movable knife 7 in a manner well known in the art. The upper end of the severed tube length 2' opens through the open upper end 8 of the mold for receiving, in a manner to be described, a blowing nozzle 10 which introduces fluid under pressure into the severed length 2' to expand it against the mold cavity 6 and produce a hollow plastic article 9 (FIG. 4).

The blowing mechanism proper includes nozzle 10 and a nozzle carrier 11, the latter being movable in a frame 12 mounted on support 1, for movement therewith, by a generally inverted U-shaped bracket 13. Frame 12 is initially positioned on bracket 13 so as to aline nozzle 10, when extended, with the open upper end 8 of the closed mold and with the severed tube length 2' therein, whereupon this central relation between the mold and the blow nozzle is pre-set and maintained.

Nozzle 10 and carrier 11 are moved by a fluid motor, conveniently comprising a pneumatic cylinder 14 also mounted on frame 12 and having a drive member in the form of a piston rod 15 mounting at its outer end a member 16 carrying a pair of oppositely disposed, roller type cam followers one of which is shown at 17 in FIGS. 6-8. Carrier 11 is formed with an opening to receive rod 15 and member 16 therein, between a pair of opposite side wall portions 18 each containing a cam slot 19 elongated axially of drive motor 14 and engaged by a cam follower 17, the slots 19 and followers 17 providing a lost-motion connection between carrier 11 and drive motor 14. Carrier 11 is mounted for reciprocation relative to frame 12 along a first axis by means including paired rollers 20 engaging recessed longitudinal tracks 21 in the opposite side walls of frame 12. A guide rod 21' projects rearwardly of carrier 11 through a pair of upstanding brackets formed on the frame. A boss 22 is provided on the underside of carrier 11, being movable therewith into engagement with a stop member 23 carried by frame 12 and defining the extended position of carrier 11.

Nozzle 10 is reciprocable within a head 24 on carrier 11 along a second axis normal to the axis of reciprocation of carrier 11. Nozzle 10 is reciprocated by an arrangement including a wedge member 25 comprising opposite side wall portions extending across the opposite sides of carrier 16 and terminating in leg portions 26 pivotally connected at 27 to carrier 11. The opposite end of wedge member 25 is bifurcated to provide fingers 28 which have sliding engagement in grooves 29 on opposite sides of nozzle 10.

The side wall portions of wedge member 25 have cam slots 30 therethrough which overlap slots 19 in carrier 11 and are upwardly and outwardly inclined relative thereto. Extensions 17' of cam followers 17 engage cam slots 30.

Frame 12 is formed to provide along the top of its opposite side walls cam surfaces 31 which are engaged by cam followers 32 of the roller type, carried by wedge member 25 on opposite sides thereof. Thus, in the retracted position of carrier 11 illustrated in FIG. 6, rollers 32 coact with cam surfaces 31 to prevent pivoting of wedge 25 relative to carrier 11. Extension of drive rod 15 therefore moves carrier 11, with nozzle 10 in its retracted position, from the retracted position of carrier 11 shown in FIG. 6 to the extended position thereof depicted in FIG. 7. At that point, cam surfaces 31 terminate and continued extension of drive member 15, through engagement of followers 17 with cam slots 30, pivots wedge member 25 from the position shown in FIG. 7 to that shown in FIG. 8. Such pivoting of wedge member 25 moves blow nozzle 10 from its retracted position, shown in FIG. 7 to its extended, blowing position shown in FIG. 8. Carrier 11 does not move during extension of nozzle 10, being held in its extended position by stop 23. Rollers 32 of wedge member 25 move downwardly along arcuate cam surfaces 33 which are provided on the front of frame 12 and which are struck on a radius taken about pivot 27 with carrier 11 in its extended position.

In operation, mold support 1 moves from the position of FIG. 1 to the position of FIG. 2 wherein mold sections 4, 5 are positioned under die 3 to receive a portion of the extruded parison 2. Mold sections 4, 5 are closed about parison portion 2' which is severed by knife 7 from the parent tube, and support 1 starts to return to the offset position shown in FIG. 3. When support 1 is clear of die 3 it trips a limit switch activating cylinder 14. Drive member 15 is thereby extended, moving carrier 11 and with it the retracted nozzle 10 from the retracted position of FIG. 6 into the extended carrier position of FIG. 7, whereby nozzle 10 is centered relative to the closed mold as support 1 is moved to its offset position. Wedge 25 is held against pivoting by engagement of rollers 32 against tracks 31, and wedge 25 and carrier 11 are moved axially by engagement of followers 17' in wedge slots 30.

Cylinder 14 continues to be activated after arrival of carrier 11 in its extended position as determined by engagement thereof against stop 23. The continued extension of drive member 15 moves wedge 25 about its pivot axis 27, thereby moving nozzle 10 from the retracted position of the latter shown in FIG. 7 to the extended, blowing position thereof shown in FIG. 8, with rollers 32 moving along arcuate tracks 33 and with followers 17, 17' moving axially along slots 19 and 30. Expanding fluid under pressure is introduced into the open upper end of tube portion 2' through nozzle 10 which is connectable to a suitable source of expansion fluid, not shown, via conduit 34. Cooling liquid is circulated through nozzle 10 via conduits 35.

At the end of the timed blowing cycle, mold sections 4, 5 are moved to open position while blow nozzle 10 remains stationary in its extended, blowing position, as shown in FIG. 8. This pulls the blown article 9 away from mold sections 4, 5. When the mold is fully open, it trips a limit switch activating cylinder 14 in the reverse direction. Drive member 15 is retracted from the position shown in FIG. 8, with followers 17, 17' moving axially along slots 19 and 30 to first retract nozzle 10 from its extended, blowing position (FIG. 8) to its retracted position (FIG. 7), thereby stripping article 9 from the nozzle 10. Continued retraction of member 15 moves carrier 11, through engagement of followers 17 with the inner, right-hand ends of slots 19 as viewed in FIG. 7, and with it the retracted nozzle 10 to the retracted carrier position of FIG. 6. Upon arrival of carrier 11 at its retracted position, a limit switch is tripped, starting the cycle over.

It will be appreciated that the aforementioned timing means and limit switches can be entirely conventional in design, and arranged to be tripped in the manner stated by any suitable means. Since they comprise no part per se of this invention, and their arrangement and operation will be readily understood by those skilled in the art, illustration and further discussion thereof is believed unnecessary. So also, the means for moving mold sections 4, 5 between open and closed position, and for moving support 1 between its illustrated positions can be of any suitable, conventional design.

The movement of carrier 11 and nozzle 10 to be retracted position of FIG. 7, removes it from the extrusion path when support 1 is in the position of FIG. 2, and the movement of support 1 to the offset position of FIGS. 1, 3 and 4 removes the mold and the extended carrier and nozzle from the extrusion path, thereby enabling continuous extrusion and high speed operation. Mounting of the blowing mechanism on the same support as mold 4, 5 maintains the pre-set centered relation between the mold and the blowing position of nozzle 10.

Of particular significance is the mechanical advantage imparted by the utilization of wedge member 25. In addition to translating movement of drive member 15 along one axis into movement of nozzle 10 along an axis normal thereto, wedge member 25 provides a force multiplying action. Further, the angle of inclination of cam slots 30 decreases as wedge member 25 moves from the retracted position of FIG. 7 to the extended position of FIG. 8, whereby the force multiplying action of wedge 25 is of increasing ratio as nozzle 10 approaches its extended, blowing position. This means that nozzle 10 can be held in its extended blowing position against the pressure of expanding fluid in the article 9 being blown, with cylinder 14 being powered from the same pressure fluid sources used for the expanding fluid, and without requiring a drive cylinder having a piston of significantly larger diameter than the blowing nozzle. The outer diameter of nozzle 10 is equal to or less than the inner diameter of the trapped plastic tube 2', and the piston is cylinder 14 can be smaller in diameter than nozzle 10 although it can, of course, be larger. However, it is not necessary, when blowing large-mouth bottles, to provide a nozzle drive piston of relatively large and cumbersome diameter, nor is it necessary to provide a second source of pressure fluid, at a higher pressure, for motor 14.

Slots 19 provide a lost motion connection between drive member 15 and carrier 11 as drive member 15 moves wedge 25 about its pivot.

It will be appreciated that additional tooling will be provided to finish the neck of the blown articles, and that the details of the illustrated mechanism can be varied. Also, while the apparatus of FIGS. 1–9 is shown as a top blow apparatus, with the blowing mechanism carried by the mold support, the blowing mechanism of FIGS. 5–9 is not limited thereto but can be used for bottom as well as top blowing and in various other arrangement.

In place of stop 23, an adjustable stop can be provided on rod 21', engageable with frame 12.

Accordingly, it is seen that my invention fully accomplishes its intended objects. The foregoing detailed description is intended to be illustrative of the invention.

I claim:

1. Apparatus for forming hollow articles of plastic material comprising, in combination with extrusion die means through which a tube of molten plastic material can be extruded in a generally vertical downward direction and with means for severing a length of plastic material from the parent tube, a mold support reciprocable laterally of the axis of extrusion in a generally horizontal plane, mold sections mounted on said support for relative movement between open and closed positions, a nozzle carrier mounted on said support and movable between a retracted position and an extended position, a blowing nozzle connectable with a source of fluid under pressure and mounted on said carrier for movement therewith between said extended and retracted positions, said nozzle when in said extended position being alined for movement into the upper end of a severed length of plastic material located between said mold sections in the closed position thereof, said nozzle being movable relative to said carrier when the latter is in said extended position into the upper end of such severed length to introduce fluid under pressure therein, together with motive means for moving said carrier between said extended and retracted position, and motion translating means operable by said motive means to move said nozzle relative to said carrier when the latter is in said extended position.

2. Apparatus for blow molding hollow articles of plastic material comprising a nozzle carrier mounted for movement along a first axis between retracted and extended positions, a blow nozzle mounted on said carrier for movement therewith along said first axis and for movement relative thereto along a second axis generally normal to said first axis, and means including force multiplying means for moving said nozzle along said second axis when said carrier is in said extended position, together with motive means including a drive member movable in the direction of said first axis, said drive member having a lost-motion connection with said carrier for moving the latter along said first axis between said positions and for continued movement of said drive member relative to said carrier after the latter has arrived in said extended position, said force multiplying means comprising motion translating means responsive to such relative movement of said drive member.

3. Apparatus as set forth in claim 2, said means for moving said nozzle relative to said carrier including wedge means.

4. Apparatus as set forth in claim 1, wherein said motion translating means includes wedge means operable with an increasing force multiplying ratio as said nozzle approaches such severed length.

5. Apparatus as set forth in claim 4, wherein said carrier includes cam slot means elongated in the direction of movement of said carrier between said extended and retracted positions, said motive means including cam follower means engaging said carrier slot means, said motion translating means including a wedge member pivotally connected adjacent one end to said carrier and connected adjacent its opposite end to said nozzle for moving the latter relative to said carrier upon pivoting of said wedge member relative to said carrier, said wedge member having cam slot means inclined relative to said carrier cam slot means and engaged by said cam follower means for pivotal movement thereby upon movement of said cam follower means along said carrier slot means, and cam means mounted on said support and engaged by cam follower means carried by said wedge member for constraining the latter against movement relative to said carrier as the latter is moved between said extended and retracted positions.

6. Apparatus as set forth in claim 2, wherein said nozzle is movable relative to said carrier between a retracted position and an extended blowing position, said force-multiplying means being of increasing ratio as said nozzle approaches its extended position.

References Cited

UNITED STATES PATENTS

| 3,075,239 | 1/1963 | Strong | 18—5(BA)X |
| 3,081,489 | 3/1963 | Jackson et al. | 18—5(BA) |
| 3,115,673 | 12/1963 | Rudolph | 18—5(BA)X |
| 3,303,249 | 2/1967 | Strauss | 18—5(BA)X |
| 3,504,397 | 4/1970 | Langecker | 18—5(BA) |

FOREIGN PATENTS

| 1,033,476 | 6/1966 | Great Britain | 18—5(BA) |
| 415,020 | 12/1966 | Switzerland | 18—5(BA) |

J. SPENCER OVERHOLSER, Primary Examiner

M. O. SUTTON, Assistant Examiner